Figure 1:
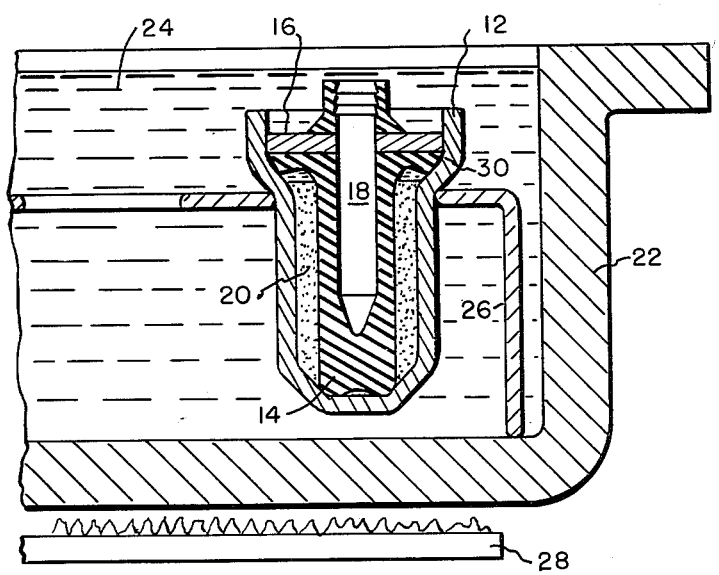
Figure 1:
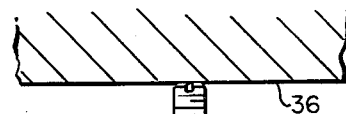

Aug. 6, 1963

J. E. WOODS 3,099,878

METHOD OF ASSEMBLY AND CALIBRATION
OF THERMAL RESPONSIVE DEVICE

Filed Oct. 16, 1958

INVENTOR.
JOHN E. WOODS
BY KENWAY, JENNEY, WITTER & HILDRETH

ATTORNEYS

United States Patent Office 3,099,878
Patented Aug. 6, 1963

3,099,878
METHOD OF ASSEMBLY AND CALIBRATION OF THERMAL RESPONSIVE DEVICE
John E. Woods, Cohasset, Mass., assignor to Standard-Thomson Corporation, Waltham, Mass., a corporation of Delaware
Filed Oct. 16, 1958, Ser. No. 767,556
4 Claims. (Cl. 29—465)

The present invention relates generally to the manufacture of thermal responsive devices, and more particularly to a method of assembling and calibrating actuators of the general type described in the U.S. Patents to C. W. Wood Nos. 2,777,638, 2,806,375 and 2,806,376.

Actuators of the type described in the above patents comprise generally a rigid metal outer housing, a metal actuator pin slidably received in a wall of the housing and resiliently urged into it by an externally-applied force, a deformable body within the housing and surrounding the pin, and a thermal fill of temperature sensitive expansible-contractible material surrounding the deformable body. Upon an increase in temperature the thermal fill expands, forcing the walls of the deformable body against the pin and causing the pin to slide outwardly from the housing against the externally-applied force. Conversely, cooling of the thermal fill causes it to shrink, whereby the pin moves under the externally-applied force into the housing a corresponding distance. Ideally, the space within the housing is entirely filled by the pin, the deformable body and the thermal fill. However, this ideal is often difficult to realize in conventional practice and voids or air pockets may exist when assembly is completed. Also, some form of calibration or zero setting must be performed after the unit is assembled to insure that the pin will project a specified distance from the housing at a specified temperature. This latter step adds to the cost of manufacture.

As described in said Patent 2,806,376, it is desired for the actuator to be so constructed and calibrated that the pin will protrude a given distance from the housing at a specified "starting temperature."

In one application described in said Patent 2,777,638, the actuator is used to control the flow of coolant between the engine block and the radiator of an internal combustion engine. The thermal fill is preferably wax which has a so-called "transition range" of temperatures through which it passes in changing from a solid to a liquid state. In this range the wax has a substantially higher thermal coefficient than at temperatures above or below the range. The "starting temperature" in this application is the value at which the valve just begins to open to permit circulation of the coolant from the engine block to the radiator. Preferably, the wax fill is formulated so that it enters the transition range at a temperature near the "starting temperature" and leaves the transition range at the temperature at which the valve is in full-open position. The above-mentioned Patent 2,806,-376 describes a specific method of calibration for actuators of this type, which is characterized by a step of inwardly bulging the sides of the housing. In assembly prior to this calibration, the housing is filled with a measured quantity of wax, the deformable body is placed in position, and the housing is closed over the deformable body with a tight mechanical seal. While the actuator is held at the "starting temperature," for example 160 degrees F., a pin is placed in position and the bulges are made progressively in the wall of the housing by dies until the actuator pin protrudes a specified distance, thus taking up any voids or air pockets left by incomplete filling.

It is a principal object of this invention to provide an improved method of assembling and calibrating actuators of the above type without the step of bulging the sides of the fully-assembled units under controlled temperature conditions, and without the expense attendant thereto.

A second object is to provide a method of assembly and calibration of the actuator unit which is simple and straightforward, whereby close quality control and precision of manufacture are rendered possible with a minimum investment in machinery.

With the foregoing and other objects in view, the principal feature of this invention resides in a method of filling the housing prior to completion of the assembly, which method involves immersing the housing to which a measured quantity of thermal fill has been added in a liquid which fills all void spaces and drives out any air that would otherwise remain in the unit when assembly is thereafter completed.

Another feature resides in completing the assembly at the "starting temperature" of the thermal fill with the actuator pin in a predetermined position, thereby calibrating the unit for use with a mechanical load having corresponding displacement limits in the range of operation.

Other features reside in certain details of assembly and calibration of the actuator unit, as hereinafter more fully described.

Figure 2:
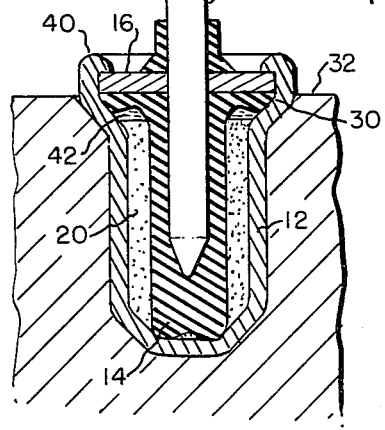

In the drawings, FIG. 1 illustrates a step in the preferred process of assembly and calibration of the actuator unit; and FIG. 2 illustrates the actuator following completion of the preferred process of assembly and calibration.

Referring to the drawings, there is provided a rigid metal housing 12 having a generally cylindrical central portion, a closed bottom end and a radially expanded open end. A body 14 of deformable material such as rubber or a rubber substitute to be received in the housing is molded about a washer-like end disk 16 adapted to fit snugly within the expanded portion of the housing 12. The body 14 is also molded about a mold pin to form a recess 18 extending through a central hole in the disk 16 and part way through the length of the body 14. After the body is cured the mold pin is removed.

Before assembly of the disk 16 with the body 14 molded thereto into the housing 12, a predetermined quantity of thermal fill 20 is placed in the bottom of the housing 12. This fill is preferably a crystalline hydrocarbon wax having a predetermined transition range of temperatures, in which it changes from the solid to the liquid state and exhibits a relatively high rate of volumetric change per degree of temperature change. This is ordinarily done at ambient room temperature, at which the thermal fill is relatively solid and may be conveniently and accurately dispensed in the form of a pellet of predetermined shape and size.

The body 12 with the thermal material 20 in place is then immersed in a tank 22 filled with water 24 and having a rack 26 to support a number of the housings in fully submerged position. The tank is provided with a heater 28 of any desired form to maintain the water 24 uniformly at the predetermined "starting temperature" of the fill 20 which, for example, may be 160 degrees F. Then, the disk 16 and body 14 are fitted into the housing 12. In this step a certain amount of water is forced out of the housing between the outer periphery of the disk 16 and the inner diameter of the housing 12. Initially, the disk 16 is not pushed forceably into the housing but is allowed to rest against a shoulder 30.

The unit is then removed from the tank 22 and inserted in a recessed fixture 32 (FIG. 2). An actuator pin 34 is then fitted in position and restrained from upward movement by an abutment 36 positioned at a fixed distance from the fixture 32. Then, the disk 16 is forced and held tightly upon the shoulder 30 of the housing 12 while the upper edge of the housing is crimped inwardly as shown at 40 to hold the disk 16 firmly in position. In this step a quantity of water escapes from the housing around the outer periphery of the disk 16, leaving a net water fill as indicated at 42 in FIG. 2. The assembly and calibration or zero setting are now completed.

It will be understood that the final step illustrated by FIG. 2 in which the housing is crimped about the periphery of the disk 16 is preferably accomplished while the contents of the housing are held closely to the "starting temperature" established in the tank 22. This method of assembly assures that at the "starting temperature," the pin 34 will always be in the position relative to the housing 12 indicated by FIG. 2. There are no voids or air bubbles within the housing because the water fill 42 fills all space not occupied by the thermal fill 20, the deformable body 14 and the pin 34. It will be understood that the water fill 42 does not adversely affect the operation of the actuator because it remains in a liquid state throughout the temperature range through which the fill 20 passes in operation. While the use of water has been described, it will be appreciated that other liquids may be substituted provided that they posses the described characteristics of water in this application.

From the foregoing, it will be appreciated that a novel and useful method of calibration for actuators of the type described in said patents has been provided. Units assembled and calibrated as herein described are of uniform and accurate calibration but relatively cheaper than units assembled and calibrated as described in said Patent 2,806,376.

Having thus described the invention, I claim:

1. The method of assembling and calibrating a thermal responsive actuator, said actuator comprising a housing, a deformable body within the housing having a recess, a quantity of temperature sensitive expansible-contractible material adjacent said body and an actuator member slidably received in an opening in the housing and extending into said recess, comprising the steps of placing a measured quantity of said material in the housing, immersing the housing in a liquid at a controlled temperature to cause the housing to be filled with said liquid, placing the deformable body within the housing to expel a portion of said liquid and leave a remaining portion thereof within the housing, and forcing said body firmly into the housing with the actuator member inserted in said recess while maintaining the liquid at said controlled temperature, forming a tight mechanical seal for the housing over the deformable body and constraining the actuator member in predetermined relation to the housing, whereby in said last-mentioned step a part of said remaining portion of said liquid is expelled from the housing leaving a further part thereof filling the voids in the housing adjacent said expansible-contractible material.

2. The method of assembling and calibrating a thermal responsive actuator, said actuator comprising a housing, a deformable body within the housing having a recess, a quantity of temperature sensitive, crystalline, expansible-contractible hydrocarbon material adjacent said body and an actuator member slidably received in an opening in the housing and extending into said recess, comprising the steps of placing a measured quantity of said material in the housing, immersing the housing in a liquid at a controlled temperature to cause the housing to be filled with said liquid, placing the deformable body within the housing to expel a portion of said liquid and leave a remaining portion thereof within the housing, and forcing said body firmly into the housing with the actuator member inserted in said recess while maintaining the liquid at said controlled temperature, forming a tight mechanical seal for the housing over the deformable body and constraining the actuator member in predetermined relation to the housing, whereby in said last-mentioned step a part of said remaining portion of said liquid is expelled from the housing leaving a further part thereof filling the voids in the housing adjacent said expansible-contractible material.

3. The method of assembling and calibrating a thermal responsive actuator, said actuator comprising a housing, a deformable body within the housing having a recess, a quantity of temperature sensitive crystalline, expansible-contractible hydrocarbon material adjacent said body and an actuator member slidably received in an opening in the housing and extending into said recess, comprising the steps of placing a measured quantity of said material in the housing, immersing the housing in a liquid at a controlled temperature adjacent one end of the transition range of said material and causing the housing to be filled with said liquid, placing the deformable body within the housing to expel a portion of said liquid and leave a remaining portion thereof within the housing, and forcing said body firmly into the housing with the actuator member inserted in said recess while maintaining the liquid at said controlled temperature, forming a tight mechanical seal for the housing over the deformable body and constraining the actuator member in predetermined relation to the housing, whereby in said last-mentioned step a part of said remaining portion of said liquid is expelled from the housing leaving a further part thereof filling the voids in the housing adjacent said expansible-contractible material.

4. The method according to claim 2, wherein the controlled temperature is related to that at which the temperature sensitive material starts to change from the solid state to the liquid state.

References Cited in the file of this patent

UNITED STATES PATENTS

| | | |
|---|---|---|
| 2,714,759 | Wagenheim | Aug. 9, 1955 |
| 2,777,638 | Wood | Jan. 15, 1957 |
| 2,806,375 | Wood | Sept. 17, 1957 |
| 2,806,376 | Wood | Sept. 17, 1957 |